United States Patent [19]
Dym et al.

[11] 4,009,338
[45] Feb. 22, 1977

[54] TABLET WITH IMPROVED PEN HEIGHT COMPENSATION

[75] Inventors: Herbert Dym; Paul Lowy, both of Poughkeepsie; Greg Salyer, Wappingers Falls, all of N.Y.

[73] Assignee: IBM Corporation, Armonk, N.Y.

[22] Filed: Dec. 22, 1975

[21] Appl. No.: 643,470

[52] U.S. Cl. ............................................. 178/18
[51] Int. Cl.² ....................................... G08C 21/00
[58] Field of Search .......... 178/18, 19, 20; 33/1 M, 33/23 J; 340/347 AD, 146.3 SY; 346/139 C Primary Examiner—Thomas A. Robinson
Attorney, Agent, or Firm—W. S. Robertson

[57] ABSTRACT

An improved operation is provided for a graphic tablet of the type in which a pen is capacitively coupled to sets of X dimension wires and Y dimension wires that are digitally activated to produce a pen signal that signifies the position of the pen on the tablet. Compensation is provided for variations in the pen signal that are attributable only to differences in the height of the pen above the tablet as the pen is operated over intervening layers of paper of various thicknesses. The drivers that activate the tablet are controlled to establish a sequence of different activation patterns and a corresponding sequence of analog pen signals. These signals are operated on to produce a pen position address that is substantially compensated for variations in pen height.

7 Claims, 7 Drawing Figures 4,009,338

TABLET WITH IMPROVED PEN HEIGHT COMPENSATION

RELATED CASES

Application Ser. No. 593,895, "Graphic Entry Tablet With Improved Addressing", filed July 7, 1975 by Herbert Dym discloses the physical construction of the preferred tablet and the organization of drivers for activating the X and Y dimension wires.

Application Ser. No. 583,350, "Tablet System With Digital Activator", filed June 2, 1975, by H. Dym and S. Kambic discloses other aspects of the preferred tablet and an operation in which the tablet is arranged to operate with a preselected pen height.

INTRODUCTION

A tablet is a graphic input device for a data processing system. A user of the tablet holds a pen (sometimes called a cursor or a stylus) to a selected point on the tablet and the tablet system produces a pair of digital values (called an address) that identify the location of the pen. In the tablets that are described in the related cases, there are X dimension wires and Y dimension wires in the tablet and these wires are energized with an alternating voltage so that the pen receives a position signal by capacitive coupling.

A review of some of the features of the operation of the tablet of Dym and Kambic will be helpful in understanding this invention. Since the operation takes place first in one dimension and then in the other, the description can be simplified by considering only one dimension, arbitrarily the X dimension. The wires along one dimension can be numbered consecutively from left to right. For generality, this number will be called X (or Y) and the number of the wire to the left (arbitrarily) of the pen position is a portion of the pen address. The space between two adjacent wires can also be thought of as being divided into a number of small intervals that are numbered sequentially starting with the space adjacent to the wire to the left of pen position so that the pen position has a further component to its address, which will be called $x$ (or $y$).

The operation of finding the X component of the pen position address has two steps. In one step, the leftmost wire of the tablet is held at ground potential and the other wires from left to right are given a progressively higher alternating voltage. A graph of this voltage along the X dimension would be approximately a ramp rising from zero voltage at the position of the leftmost wire to a maximum voltage at the position of the rightmost wire. Thus, there is a linear relationship between the voltage of a wire and the number that represents the position of the wire. Because the pen is coupled to the wire capacitively, it does not sense the voltage of the wire directly. Nevertheless, a graph of the pen voltage is also a ramp with zero voltage at the left edge of the tablet and a maximum voltage at the right edge of the tablet. This maximum voltage will be called the reference voltage.

The capacitive coupling between the pen and the wires of the tablet increases when the pen is held close to the wires and decreases when the pen is held farther from the wires, and the pen voltage similarly decreases as the pen is raised from the tablet. The second step in this operation to form address component X provides pen height compensation. For this step, all of the wires of one dimension are energized with the maximum alternating voltage. Regardless of the actual position of the pen, it receives the reference voltage, i.e. the voltage that it would have received if it had been moved to the rightmost position during the first step when the ramp voltage distribution is applied to the tablet. The actual pen position is a function of the ratio of the two pen voltages. For example, if there are 100 intervals between wires along one dimension of the tablet, a voltage ratio of 0.27 signifies that the pen is just to the left of wire number 27.

In the tablet of Dym and Kambic digital drivers are used for forming the $x$ (or $y$) component of the address. A driver is controllable to maintain a wire at either ground potential or at a fixed amplitude alternating voltage, and it is convenient to identify the corresponding states of a wire as 0 and 1. The tablet drivers are operated to produce a 0 to 1 transition at the pen position. The voltage in the region of this transition is a linear function of pen position, and the pen position can be derived from the pen voltage and the reference voltage.

SUMMARY OF THE INVENTION

In one step in the operation of the new tablet system of this invention, the pen signal is sampled when the wires on the right side of the pen are activated and the wires on the left side are not activated to produce the 0 to 1 transition as described in the application of Dym and Kambic. The pen signal that this operation produces will be called P0. Another operation produces a complementary activation pattern with a 1 to 0 transition at the pen position; wires to the left of the pen position are activated and wires to the right are not activated. The pen signal that is produced by this operation will be called *P0. By symmetry, the average of these two signals is the signal that would be sensed if the pen were located at the mid point between the two adjacent wires. This average value is also one half of the conventional reference value, R, and it will be called R/2. (Notice that reference voltage in FIG. 2 is the same as the reference voltage that is referred to in the Introduction of this specification; however, in the operation described previously the tablet voltage rises linearly to the reference value at one edge and the value R/2 occurs only at the midpoint of the tablet.) In a third operation the 0–1 transition in the activation pattern is shifted one wire to the right (arbitrarily) so that the pen senses a voltage that is shifted on the characteristic curve by the pitch, P, between adjacent wires. This pen signal is designated P1. The pen address component $x$ is defined according to the following relationship among the pen signals.

$$x = \frac{P}{2} + P \left[ \frac{P0 - \left[ \frac{P0 + {}^*P0}{2} \right]}{P0 - P1} \right] \text{ or } \frac{P}{2} + \frac{P}{2} \frac{(P0 - {}^*P0)}{(P0 - P1)}$$

The detailed description of the preferred embodiment of the invention will present other objects, features and advantages of the invention.

THE DRAWING

FIG. 1 shows a tablet and associated addressing and control circuits of the cited application of H. Dym.

FIGS. 2 and 3 are from the cited application of H. Dym and S. Kambic, and show the pen characteristics of a tablet having digital activation.

DETAILED DESCRIPTION

Figure 1:
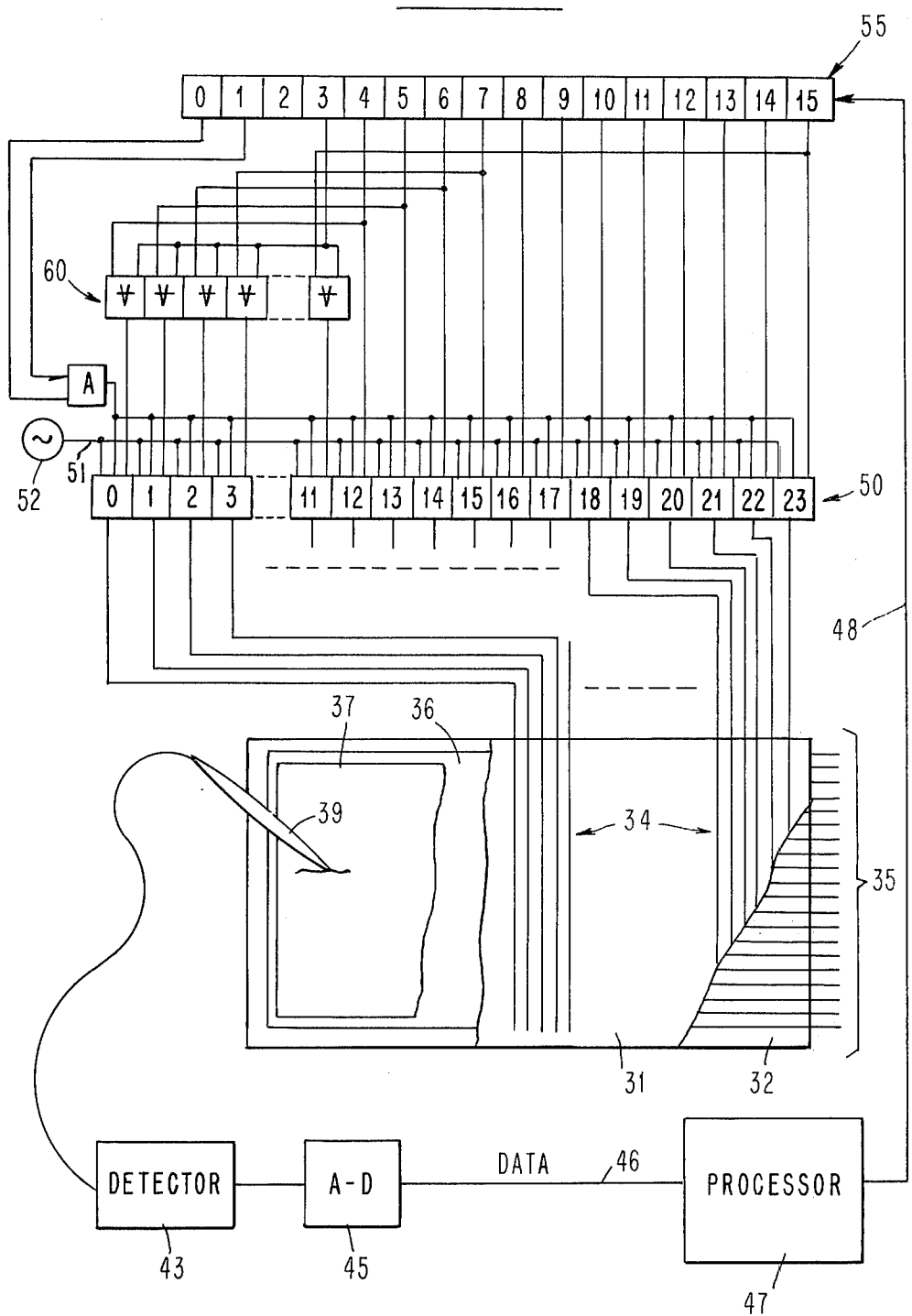

Introduction — FIG. 1

FIG. 1 shows the tablet and associated controller of the cited application of H. Dym as an example of a tablet system that might use this invention. The tablet has a set of X dimension wires 34, a set of Y dimension wires 35, supporting and insulating layers 31, 32 and a protective layer 36 of glass or other suitable material. A user of the tablet may put one or several layers of paper 37 over the glass. These thicknesses change the height of a pen above the tablet and in the prior art require resetting the relationship between pen signal and the pen position. The X dimension wires are coupled to a set of drivers 50 and the Y dimension wires are coupled to a similar set of drivers that is not shown in the drawing. A user of the tablet holds a pen 39 at a selected position on the tablet. The pen receives the alternating voltage from the activated tablet wires by capacitive coupling, and a detector 43 and an analog to digital converter 45 convert the pen voltage to a corresponding digital signal that is transmitted on a bus 46 to a processor 47.

Each driver of set 50 receives a signal on a line 51 from an oscillator 52. The waveform of the oscillator is rectangular to present an alternating sequence of 1 and 0 bits. A driver is controlled by the AND function of its inputs to produce the alternating voltage of oscillator 52 at its output to activate an associated wire. In the absence of a coincidence of these inputs, a driver maintains its output at a fixed potential.

A register 55 holds a sixteen bit control word to control the selection of the X and Y dimension drivers. Bit positions 4-15 hold an address that controls the location of a 1-0 or 0-1 transition in the activation pattern of the drivers. Drivers 12-23 are controlled directly according to this address and in the operations that will be described later drivers 0-11 are controlled according to the complement of this address. Register positions 0-3 hold control bits. In the operations that will be described register position 0 holds a 1 to enable either the X or the Y drivers to respond to the address held in bit positions 4-15 of register 55. A zero bit in register position 0 inhibits both sets of drivers. A 0 in register position 1 enables the X drivers 50 and a 1 enables the Y drivers. Register position 2 is not used in these operations. Register position 3 holds a 1 in the operations that will be described to control a set of Exclusive OR gates 60 to invert the address for drivers 0-11.

Figure 2:
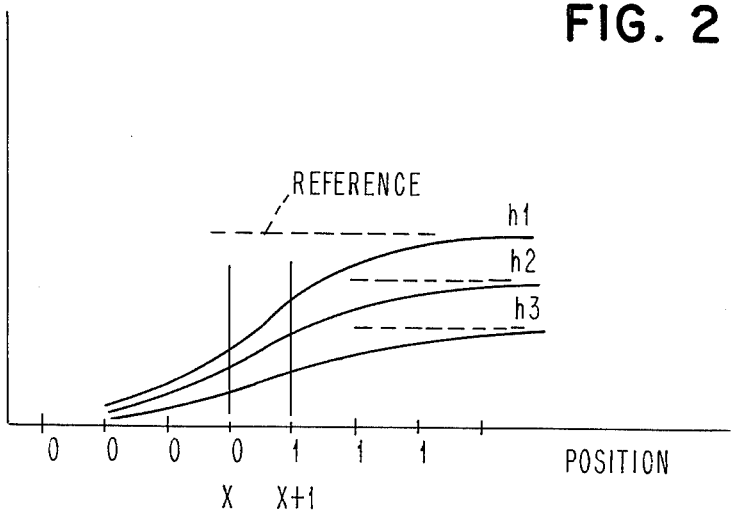
Figure 3:
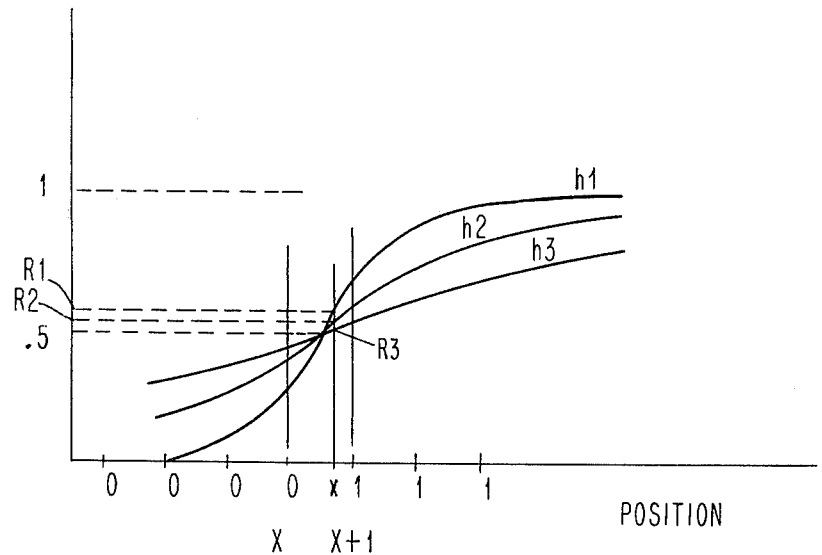

Pen Characteristic Curves — FIGS. 2 and 3

FIGS. 2 and 3, from the application of Dym and Kambic, provide an introduction to the pen characteristic curves that will be used later in the description of this invention and they also show how the pen signal is affected when the pen height is changed. The horizontal axis in FIG. 2 shows positions of two wires X and X+1 and neighboring wires. As 0's and 1's along the X axis represent, wire X+1 and wires to the right are activated and wire X and wires to the left are not activated to produce a 0 to 1 transition at wires X and X+1. The vertical axis shows the analog pen signal at the input to detector 43 or the equivalent digital signal at the input of processor 47. The family of pen characteristic curves show that the pen signal at a particular address is higher for a low pen height $h1$ and lower for a higher pen height $h2$. The curves also show that the characteristics are linear in the region between wires X and X+1 for a significant distance on eigher side of the region.

FIG. 3 shows curves for the ratio of the pen signal of FIG. 2 to the corresponding reference value. (The scale of the drawing exaggerates the non-linearity of the curves.) This ratio can be used to find the address $x$ as has already been described. For example, when the pen is at address $Xx$ (equivalently designated $X + x$) and at height $h3$ in FIG. 3, the pen produces a unique ratio R3 that identifies address component $x$. However, when the pen is operated at a reduced height $h1$, the larger pen ratio R1 is produced. This ambiguity can be resolved by operating at a fixed pen height or by using the improved method of this invention, which will be described next.

Figure 4:
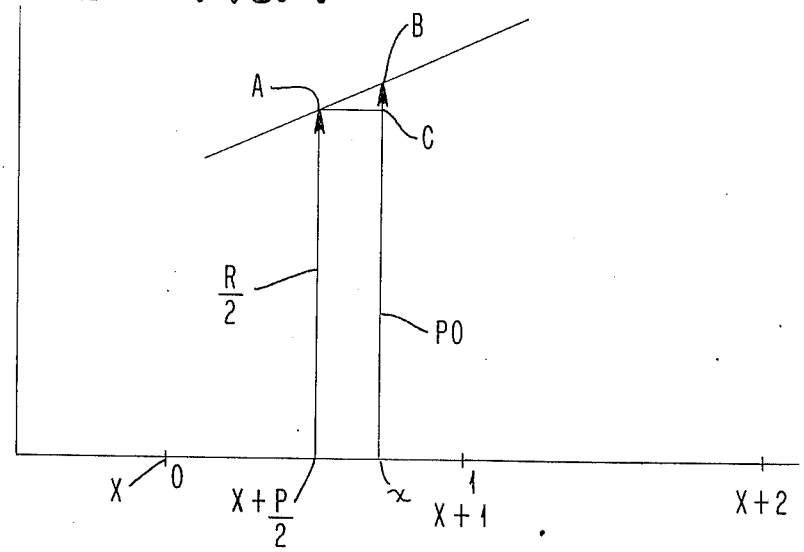
FIGS. 4, 5 and 6 show the pen characteristics that accompany the activation patterns that are used according to this invention.
Figure 5:
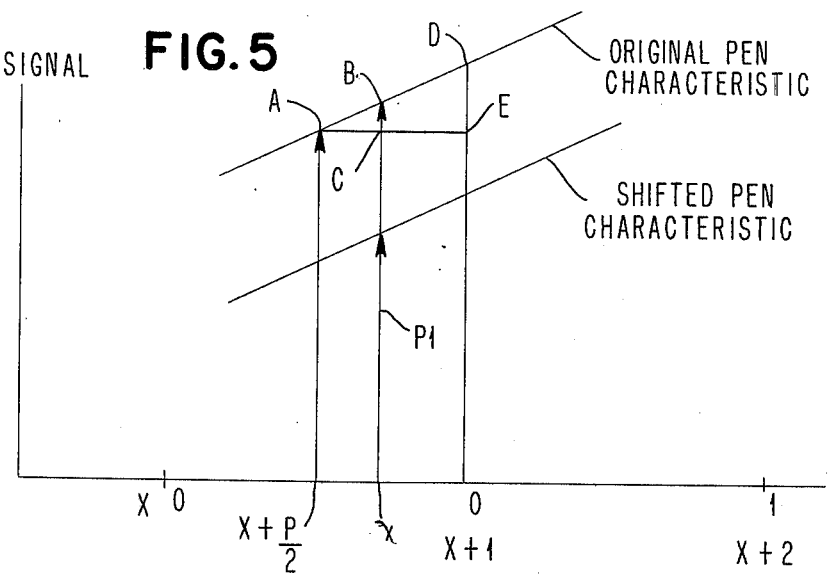
Figure 6:
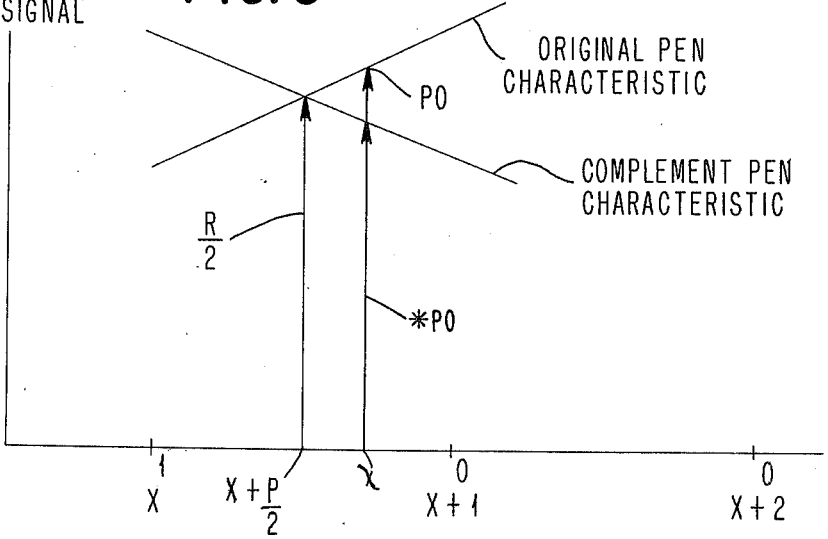

Pen Height Compensation — FIGS. 4, 5 and 6

These figures show the activation patterns and portions of the associated pen characteristic curves for the operations that produce three pen signals that are designated P0, P1, and *P0. FIG. 4 shows one of the pen characteristic curves of FIG. 2 in the region of wires X, X+1, and X+2. For the step that FIG. 4 illustrates, wire X and wires to the left are unactivated and wires X+1, X+2 and other wires to the right are activated, as in FIG. 2. In this operation, a pen at point $x$ produces the signal P0 which has an amplitude that is established by the pen characteristic.

As FIG. 4 also shows, at a mid-point between wire X and wire X+1, point X+P/2, the height of the reference curve is half the reference value and is designated R/2. The value of R/2 is not established solely by this step of our method, but the significance of P0 and R/2 can be understood from FIG. 4. The pen signal P0, the value R/2 and the slope of the characteristic curve define a triangle having vertices A, B, and C. Side B-C of this triangle has the length P0-R/2.

Although the step that is illustrated in FIG. 6 is preferably performed last, FIG. 6 can be understood readily in relation to FIG. 4 and will be described here. FIG. 6 shows the pen characteristic for the complement of the activation pattern of FIG. 4. Wire X and wires to the left are activated and wires X+1, X+2 and wires to the right are unactivated. The resulting complement pen characteristic is reversed in relation to the original pen characteristic of FIG. 4, which is also shown in FIG. 6. In response to this activation pattern, the pen produces a signal that is designated *P0. By symmetry it can be seen that the average of signals P0 and *P0 equals one-half of the reference value, R/2, or, equivalently, that the sum of P0 and *P0 equals the reference value. Thus, side B-C of the triangle of FIG. 4 equals P0−[(P0+ *P0)/2]. For an operation at a fixed pen height, the address component $x$ can be developed from these signals. The step that is illustrated in FIG. 5 establishes the slope of the pen characteristic curve so that the operation is independent of the actual pen height.

FIG. 5 shows an activation pattern that is shifted one wire to the right from FIG. 4. FIG. 5 shows both the original pen characteristic curve of FIG. 4 and the shifted pen characteristic curve. In response to this activation, a pen at point x produces a signal P1. It can be seen from FIG. 5 that the vertical spacing between the original pen characteristic and the shifted pen characteristic equals P0-P1. FIG. 5 shows a triangle A, D, E that is similar to the triangle A, B, C that was introduced in FIG. 4 and is also shown in FIG. 5. Side A-E of this triangle equals one half the pitch of the wires, P/2. Side D-E of this triangle equals one-half the vertical spacing of the two characteristic curves, (P0-P1)/2. Thus, it can be seen that the pen position is defined by the following relationships:

1. A—C:A—E = B—C:D—E (since triangle ABC similar to triangle ADE.)

$$A - C : \frac{P}{2} = P0 - \frac{P0 + {}^*P0}{2} : \frac{P0 - P1}{2} \qquad 2)$$

(substituting P/2 for side A—E, P0—[(P0+*P0)/2)] for side B-C, and (P0-P1)/2 for side D-E)

$$A - C = \frac{P}{2} \; \frac{P0 - \frac{P0 + {}^*P0}{2}}{\frac{P0 - P1}{2}} \qquad 3)$$

$$x = \frac{P}{2} + P \left[ \frac{P0 - \left[ \frac{P0 + {}^*P0}{2} \right]}{P0 - P1} \right] \; \text{or} \; \frac{P}{2} + \frac{P}{2} \; \frac{(P0 - {}^*P0)}{(P0 - P1)} \qquad 4)$$

(since x = P/2 + the length of side A-C)

This relationship can be derived and expressed in various equivalent ways. For example, the operation can be understood from a counterpart hypothetical operation in which the activation pattern is kept constant and the pen is physically moved from its address X,x to positions X,P/2 and X+1,x. This equivalent sequence can be seen to produce pen signals for the fixed but unknown position, X,x and two signals for points that have a known separation from the pen position but are otherwise arbitrarily located within the limits of linearity of the pen characteristic curve. It can also be seen that the sequence in which the steps are performed is arbitrary, but in the preferred sequence the signals P0 and *P0 are formed first and last (in either order) so that their averaging to produce the value R/2 tends to average any changes in pen height that occur during the operation and this average pen height value tends to correspond to the pen height when signal P1 is sampled.

OPERATION AND APPARATUS

The application of our method to tablets of various specific construction will be readily apparent from the preceding description of the operation in terms of the pen characteristic curves, but it will be helpful to present the operation also in relation to processor 47 of FIG. 1. The processor has three separate functions: controlling the tablet by loading register 55 with an appropriate control word and sampling and storing the resulting pen signal on bus 46, performing the arithmetic operation of the preceding equation on the pen signal to produce the x and y components of the address, and using the address X,x, Y,y in an operation that the user of the tablet system selects. The final use of the address is independent of this invention and is mentioned here only so that it will be distinguished from the other two operations.

The apparatus for controlling the tablet through register 55 and for sampling the pen signal will ordinarily be specialized for control of the tablet and is commonly called a controller. Controllers commonly have data storage capability and general purpose arithmetic and logic processing capability and operate from stored programs. These general purpose components of the processor would be organized to provide the following components for the control operation.

Means is provided for receiving signals from the pen and storage locations are designated for storing these signals. These storage locations are commonly called registers or buffers and can be given symbolic addresses such as, P0, *P0 and P1 or recognizable variants. The controller also has a register for storing the constant value of pitch P between wires and this register may have a symbolic name such as P.

Means is provided for forming the control bits and the address bits of a control word and for transmitting the control word to register 55. Since there are a limited number of these control words, tables of the control words can be held in a designated area of the storage of processor 47 and fetched in the appropriate sequence. These tables are appended to this specification.

In the tables the leftmost column is the address component X or Y that identifies the wire to the left of the pen position and is found by the operations that have been described before. This address forms a pointer to the control word. The tables show the sixteen address bits for the control words. The control words also have four control bits in positions 0 - 3 which are 10φ1 for the X dimension and 11φ1 for the Y dimension, as already explained, where φ signifies that bit 2 may be either a 1 or a 0.

The representative rows in the tables show that the 0 - 1 transitions in Tables I and II shift one position to the right on successive rows of the table. The pattern of 1 and 0 bits in the address position of the control word similarly shifts to the right in Tables I and II. In addition, Table II is shifted one position to the right from the corresponding row in Table I. The activation pattern and the control word address of Table III are the complement of Table I. Thus it can be seen that the control word list of a single table can be used to form the control word lists for the other tables from their logical relationship to the single table or that the control words can be formed directly from the X or Y component of the address by means such as a program of instructions or equivalent logic and arithmetic components for these operations. The technique of operating a shift register to form a control word, taught in the application of Dym and Kambic, may also be used to form the control words of the tables.

Preferably the arithmetic components of processor 47 operate on the stored values P, P0, *P0 and P1 to form the values $x$ and $y$ according to the equation that was described in the preceding section of the specification. Appropriate programming statements in various programming systems will be readily apparent from the equation.

Figure 7:
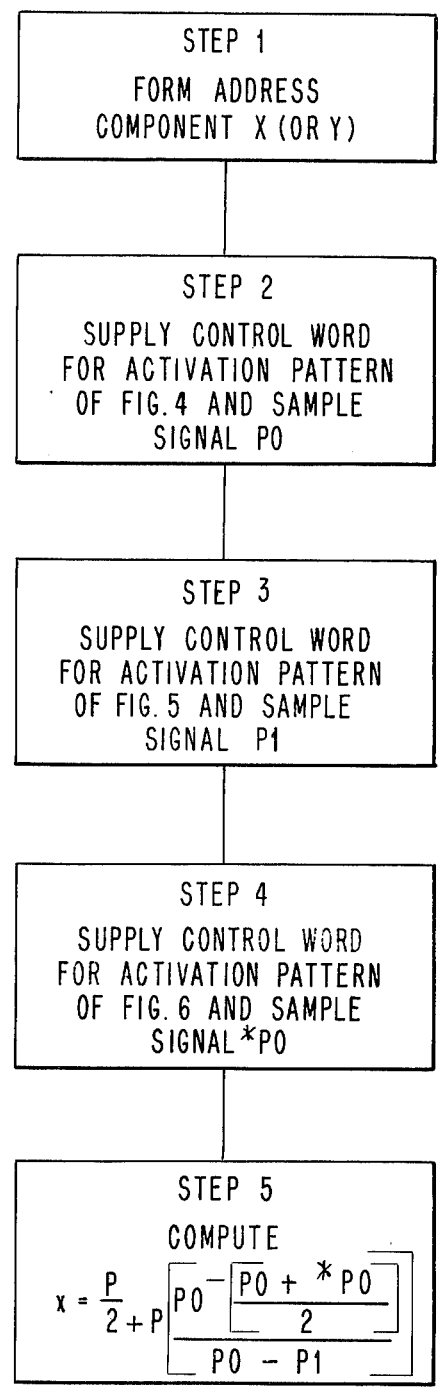
FIG. 7 shows the sequence of steps that are used in the tablet operation of this invention.

These operations are shown in FIG. 7. Step 1 in FIG. 7 represents the preliminary operation for forming the X or Y address. Step 1 can be initiated periodically, in response to a manually operated switch, or when a changed input appears on bus 46. In step 2, the X address is used to fetch or otherwise form the appropriate control word from table 1. The drivers switch to the activation states established by the control word and the pen produces a new signal, P0, which is supplied to processor 47 and stored at a designated location.

When the operation has been completed for one dimension, the same sequence of operations is performed for the other dimension. With the completion of step 4 for both dimensions (or alternately for each dimension) the operation advances to step 5 in which the values $x$ and $y$ are calculated. With the completion of step 5, the address X,$x$, Y,$y$ is available for use in programs or operations selected by the user of the tablet.

From this description of a preferred embodiment of the invention those skilled in the art will recognize a variety of applications and a corresponding range of variation in the method and associated apparatus of this invention within the skill of the art and the scope of the claims.

What is claimed is:

1. A method for operating a graphic tablet having X dimension wires and Y dimension wires, means for selecting one of said sets of wires to be given a pattern of activation in which a wire is given a fixed potential

TABLE I (FIG. 4)

| Wire | Activation Pattern | | | | | | Control Word Address | | |
|---|---|---|---|---|---|---|---|---|---|
| 0 | 0111 | 1111 | 1111 | 1000 | 0000 | 0000 | 1000 | 0000 | 0000 |
| 1 | 0011 | 1111 | 1111 | 1100 | 0000 | 0000 | 1100 | 0000 | 0000 |
| 2 | 0001 | 1111 | 1111 | 1110 | 0000 | 0000 | 1110 | 0000 | 0000 |
| 3 | 0000 | 1111 | 1111 | 1111 | 0000 | 0000 | 1111 | 0000 | 0000 |
| . | | | | | | | | | |
| 10 | 0000 | 0000 | 0001 | 1111 | 1111 | 1110 | 1111 | 1111 | 1110 |
| 11 | 0000 | 0000 | 0000 | 1111 | 1111 | 1111 | 1111 | 1111 | 1111 |
| 12 | 1000 | 0000 | 0000 | 0111 | 1111 | 1111 | 0111 | 1111 | 1111 |
| 13 | 1100 | 0000 | 0000 | 0011 | 1111 | 1111 | 0011 | 1111 | 1111 |

TABLE II (FIG. 5)

| Wire | Activation Pattern | | | | | | Control Word Address | | |
|---|---|---|---|---|---|---|---|---|---|
| 0 | 0011 | 1111 | 1111 | 1100 | 0000 | 0000 | 1100 | 0000 | 0000 |
| 1 | 0001 | 1111 | 1111 | 1110 | 0000 | 0000 | 1110 | 0000 | 0000 |
| 2 | 0000 | 1111 | 1111 | 1111 | 0000 | 0000 | 1111 | 0000 | 0000 |
| . | | | | | | | | | |
| 11 | 0000 | 0000 | 0001 | 1111 | 1111 | 1110 | 1111 | 1111 | 1110 |
| 12 | 0000 | 0000 | 0000 | 1111 | 1111 | 1111 | 1111 | 1111 | 1111 |
| 13 | 1000 | 0000 | 0000 | 0111 | 1111 | 1111 | 0111 | 1111 | 1111 |
| 14 | 1100 | 0000 | 0000 | 0011 | 1111 | 1111 | 0011 | 1111 | 1111 |

TABLE III (FIG. 6)

| Wire | Activation Pattern | | | | | | Control Word Address | | |
|---|---|---|---|---|---|---|---|---|---|
| 0 | 1000 | 0000 | 0000 | 0111 | 1111 | 1111 | 0111 | 1111 | 1111 |
| 1 | 1100 | 0000 | 0000 | 0011 | 1111 | 1111 | 0011 | 1111 | 1111 |
| 2 | 1110 | 0000 | 0000 | 0001 | 1111 | 1111 | 0001 | 1111 | 1111 |
| 3 | 1111 | 0000 | 0000 | 0000 | 1111 | 1111 | 0000 | 1111 | 1111 |
| . | | | | | | | | | |
| 10 | 1111 | 1111 | 1110 | 0000 | 0000 | 0001 | 0000 | 0000 | 0001 |
| 11 | 1111 | 1111 | 1111 | 0000 | 0000 | 0000 | 0000 | 0000 | 0000 |
| 12 | 0111 | 1111 | 1111 | 1000 | 0000 | 0000 | 1000 | 0000 | 0000 |
| 13 | 0011 | 1111 | 1111 | 1100 | 0000 | 0000 | 1100 | 0000 | 0000 |

In step 3 the processor similarly supplies register 55 with the appropriate control word for the activation pattern of FIG. 5 and stores the pen signal P1. In step 4 the processor supplies register 55 with the appropriate control word from Table III and stores the resulting pen signal, *P0.

(designated 0) or is given an alternating voltage of a predetermined amplitude (designated 1), said wires being individually activatable to produce a 0-1 transition in the region of a selected pair of adjacent wires, and a pen for capacitively receiving a position signal from wires of the dimension selected for activation, the pen position signal for a predetermined height of the pen above the tablet surface being related to the position of the pen between said two adjacent wires by a characteristic curve that is closely linear in the region between said two adjacent wires and a portion of the space outside of said two adjacent wires, comprising, producing a first activation pattern having said 0-1 transition in the region of the wires adjacent to the pen position and sampling a first pen position signal, said first pen position signal representing a locus on the pen characteristic curve at said pen position, producing a second activation pattern in which said 0-1 transition is shifted from the position of said first activation pattern by the pitch, P, between wires and sampling a second pen position signal, said second pen position signal representing a locus on said pen characteristic curve at a second position shifted from said pen position by the value of said pitch between wires, producing a third activation pattern and sampling a third pen position signal, said third pen position signal representing a locus on said pen characteristic curve at a third position on said pen characteristic curve, and forming an address identifying the position of said pen with respect to one of said adjacent wires according to said value P and said first, second and third pen position signals.

2. The method of claim 1 wherein the step of producing said third activation pattern and sampling said third pen position signal comprises producing said activation pattern and sampling a pen position signal representing a locus on said pen characteristic curve at a third point having a predetermined spacial relationship to said pen position.

3. The method of claim 2 wherein the step of producing said third activation pattern and sampling said third pen position signal comprises producing said third activation pattern in the complement of said first activation pattern and sampling said third pen signal in the region of the resulting 1-0 transition.

4. The method of claim 3 including producing said activation patterns in the sequence first, second and third, and wherein said step of forming said pen position address includes averaging said first and third pen position signals, whereby any continuous variation in pen height during said three steps of sampling said pen signals is compensated for.

5. The method of claim 4 wherein said first, second and third pen position signals are disignated P0, P1 and *P0 respectively, said one adjacent wire is designated X for the X dimension and said address is designated $x$ for the X dimension, and wherein said step of forming said address comprises forming said address according to the following relationship $$x = \frac{P}{2} + \frac{P}{2} \frac{(P0 - {}^*P0)}{(P0 - P1)}.$$

6. In combination with a graphic tablet having X dimension wires and Y dimension wires, means for selecting one of said sets of wires to be given a pattern of activation in which a wire is given a fixed potential (designated 0) or is given an alternating voltage of a predetermined amplitude (designated 1), said wires being individually activatable to produce a 0-1 transition in the region of a selected pair of adjacent wires, and a pen for capacitively receiving a position signal from wires of the dimension selected for activation, the pen position signal for a predetermined height of the pen above the tablet surface being related to the position of the pen between said two adjacent wires by a characteristic curve that is closely linear in the region between said two adjacent wires and a portion of the space outside of said two adjacent wires, apparatus for controlling the tablet to produce a pen position address that is compensated for variations in the height of the pen above the X and Y dimension wires or the tablet, comprising, means for controlling said tablet to produce a first activation pattern having a 0-1 transition in the region of two wires of a selected dimension at the pen position for producing a first pen signal, means for controlling said tablet to produce a second activation pattern in which the 0-1 transition is shifted by the pitch, P, between wires for producing a second pen signal, means for controlling said tablet to produce a third activation pattern that is the complement of said first pattern whereby a 1-0 transition occurs in said region of two wires at the pen position for producing a third pen signal, and means for receiving said first, second and third pen signals and means for forming a pen position address according to the value of said signals and said value P.

7. The apparatus of claim 6 wherein said tablet includes a register for holding an address defining two wires where a transition occurs in the activation pattern of a selected dimension of the tablet and said means for controlling said tablet to produce said first, second and said third activation patterns comprises respectively means for loading said register according to the bit pattern of Table I, Table II, and Table III.

* * * * *